US008368683B2

(12) United States Patent
Lee

(10) Patent No.: US 8,368,683 B2
(45) Date of Patent: Feb. 5, 2013

(54) POWER-OFF CONTROL CIRCUIT AND LIQUID CRYSTAL DISPLAY PANEL COMPRISING THE SAME

(75) Inventor: Chow-Peng Lee, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 485 days.

(21) Appl. No.: 12/691,789

(22) Filed: Jan. 22, 2010

(65) Prior Publication Data

US 2011/0181573 A1 Jul. 28, 2011

(51) Int. Cl.
*G06F 3/038* (2006.01)

(52) U.S. Cl. .......................................................... 345/211

(58) Field of Classification Search .................... 345/87, 345/95, 98, 100, 211–212
See application file for complete search history.

(56) References Cited

U.S. PATENT DOCUMENTS

| | | | | |
|---|---|---|---|---|
| 5,945,970 | A * | 8/1999 | Moon et al. | 345/92 |
| 2003/0184538 | A1* | 10/2003 | Yamato et al. | 345/211 |
| 2007/0296660 | A1* | 12/2007 | Kimura et al. | 345/87 |
| 2008/0084412 | A1* | 4/2008 | Bae et al. | 345/212 |
| 2008/0303775 | A1* | 12/2008 | Guo et al. | 345/98 |

* cited by examiner

*Primary Examiner* — Chanh Nguyen
*Assistant Examiner* — John Kirkpatrick
(74) *Attorney, Agent, or Firm* — McClure, Qualey & Rodack, LLP

(57) ABSTRACT

A power-off control circuit adapted in a LCD panel comprising a gate pulse modulator and a level shifter is provided. The power-off control circuit comprises a logic gate and a control switch. The logic gate comprises a first input to receive an internal power supply, a second input to receive a power state signal and a logic output to generate a control signal. When the power supply is on, the internal power supply is on and the power state signal is in a first state to make the control signal turn off the control switch. When the power supply is off, the internal power supply is on and the power state signal is in a second state to make the control signal turn on the control switch to make the gate pulse modulator makes pixels of a pixel array to perform a discharge activity.

21 Claims, 4 Drawing Sheets

POWER-OFF CONTROL CIRCUIT AND LIQUID CRYSTAL DISPLAY PANEL COMPRISING THE SAME

BACKGROUND

1. Technical Field

The present invention relates to a display device. More particularly, the present invention relates to a power-off control circuit adapted in a liquid crystal display panel and a liquid crystal display panel.

2. Description of Related Art

Liquid crystal display (LCD) is a thin, flat panel used for electronically displaying information such as text, images, and moving pictures. Its uses include monitors for computers, televisions, instrument panels, and other devices. The features of the LCD such as lightweight construction, portability, low electrical power consumption and ability to be produced in much larger screen sizes make LCD become the mainstream of modern display technology.

When the panel is in operation, the display data sent to the data driver makes the electrical charges in the pixels of the pixel array alter to present the image one observes. However, when the power of the LCD turns off, if there is no discharging mechanism for the pixels to dissipate the electrical charges, the remaining electrical charges in the pixels makes the panel present afterimage even the panel is substantially not in operation, which is an undesirable result.

Accordingly, what is needed is a power-off control circuit adapted in a liquid crystal display panel and a liquid crystal display panel to provide a discharging mechanism to eliminate the afterimage effect. The present disclosure addresses such a need.

SUMMARY

An aspect of the present disclosure is to provide a power-off control circuit adapted in a liquid crystal display panel, wherein the liquid crystal display panel comprises a gate pulse modulator and a level shifter having a level-shift output connected to the gate pulse modulator, the power-off control circuit comprises a logic gate and a control switch. The logic gate comprises a first input, a second input and a logic output. The first input is to receive an internal power supply. The second input is to receive a power state signal. The logic output is to generate a control signal according to the first input and the second input. The control switch is to receive the control signal and to be connected to the level-shift output. When the power supply is on, the internal power supply is on and the power state signal is in a first state to make the control signal turn off the control switch. When the power supply is off, the internal power supply is on during a certain time period and the power state signal is in a second state opposite to the first state to make the control signal turn on the control switch in the certain time period such that the voltage of the level-shift output maintains at a certain level to make the gate pulse modulator turn on the gates of a plurality of pixels of a pixel array of the liquid crystal display panel to perform a discharge activity.

Another aspect of the present disclosure is to provide a liquid crystal display panel. The liquid crystal display panel comprises a level shifter, a pixel array, a gate pulse modulator and a power-off control circuit. The level shifter comprises a level shift stage and an output stage having a level-shift output. The gate pulse modulator is connected to the level-shift output and the pixel array. The power-off control circuit comprises a logic gate and a control switch. The logic gate comprises a first input, a second input and a logic output. The first input is to receive an internal power supply. The second input is to receive a power state signal. The logic output is to generate a control signal according to the first input and the second input. The control switch is to receive the control signal and to be connected to the level-shift output. When the power supply is on, the internal power supply is on and the power state signal is in a first state to make the control signal turn off the control switch such that the level-shift output receives the voltage from level shifter to control the gate pulse modulator to further control the gates of a plurality of pixels of the pixel array. When the power supply is off, the internal power supply is on during a certain time period and the power state signal is in a second state opposite to the first state to make the control signal turn on the control switch in the certain time period such that the voltage of the level-shift output maintains at a certain level to make the gate pulse modulator turn on the gates of the plurality of pixels of the pixel array of the liquid crystal display panel to perform a discharge activity.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
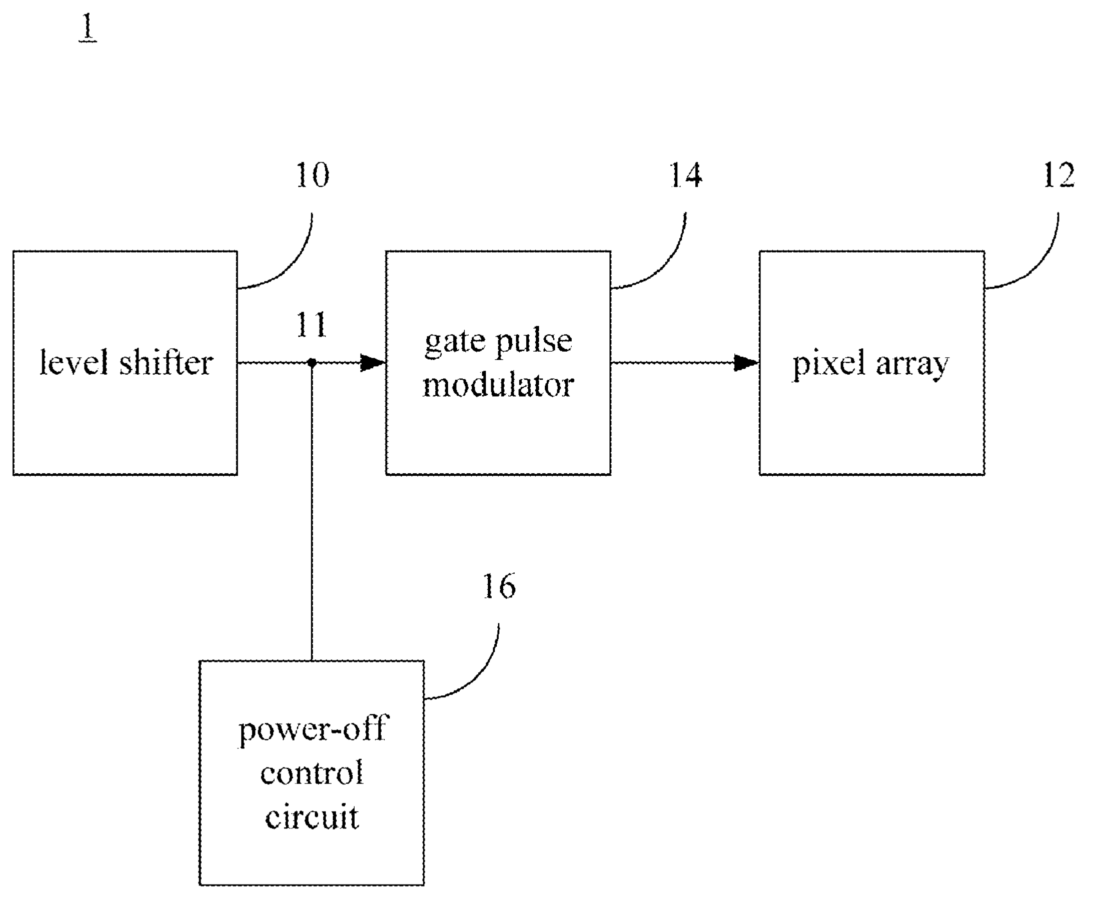
FIG. 1 is a diagram of the liquid crystal display panel in an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a diagram of the liquid crystal display panel 1 in an embodiment of the present disclosure. The liquid crystal display panel 1 comprises a level shifter 10, a pixel array 12, a gate pulse modulator 14 and a power-off control circuit 16.

The level shifter 10 has a level-shift output 11 connected to the gate pulse modulator 14. The gate pulse modulator 14 is connected to the level-shift output 11 and the pixel array 12. When the liquid crystal display panel 1 is in operation, i.e. a power supply (not shown) of the liquid crystal display panel 1 is on, the gate pulse modulator 14 receives the voltage from level shifter 10 through the level-shift output 11 and controls the gates of a plurality of pixels of the pixel array 12 to turn on or off.

However, when the power of the liquid crystal display panel 1 turns off, if there is no discharging mechanism for the pixels to dissipate the electrical charges, the remaining electrical charges in the pixels makes the liquid crystal display panel 1 present afterimage even the liquid crystal display panel 1 is substantially not in operation, which is an undesirable result.

Figure 2:
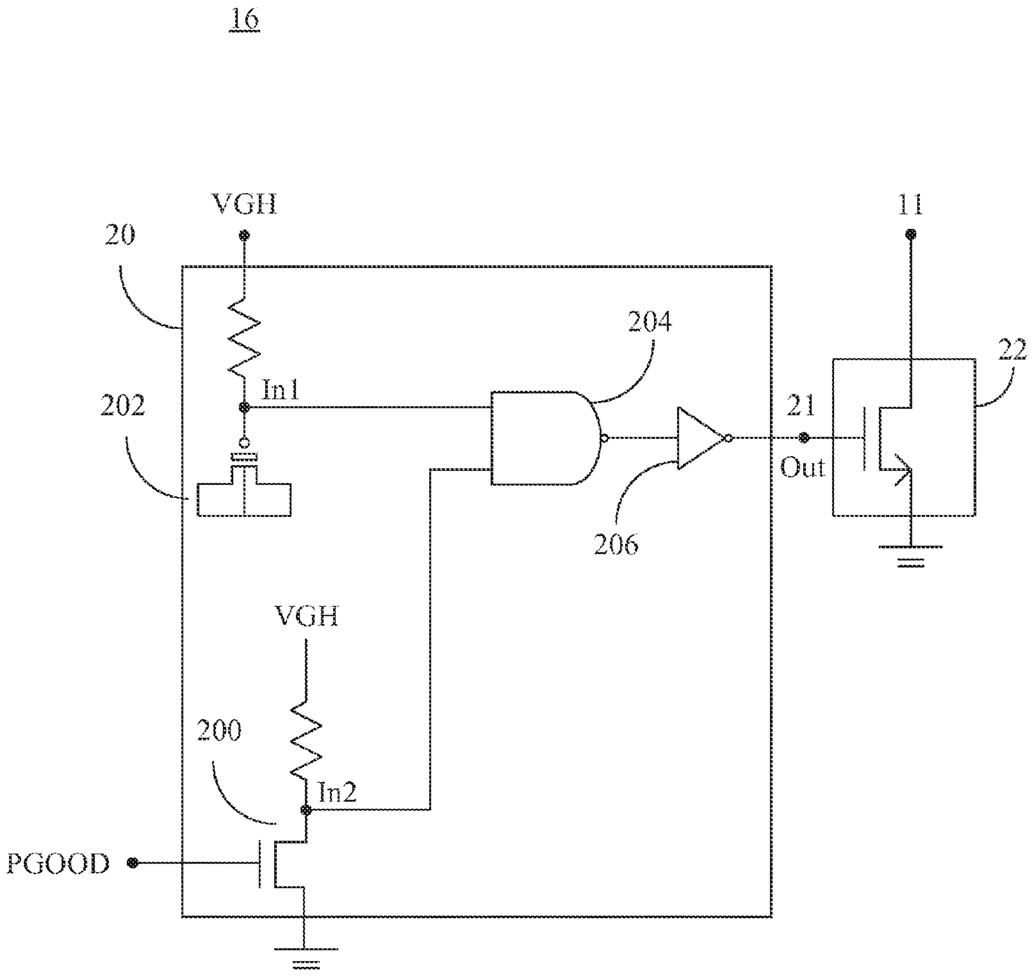
FIG. 2 is a diagram of the power-off control circuit in an embodiment of the present disclosure.

Please refer to FIG. 2. FIG. 2 is a diagram of the power-off control circuit 16 in an embodiment of the present disclosure. The power-off control circuit 16 comprises a logic gate 20 and a control switch 22. The logic gate 20 comprises a first input In1, a second input In2 and a logic output Out. The first input In1 is to receive an internal power supply $V_{GH}$. The second input In2 is to receive a power state signal PGOOD.

Figure 4:
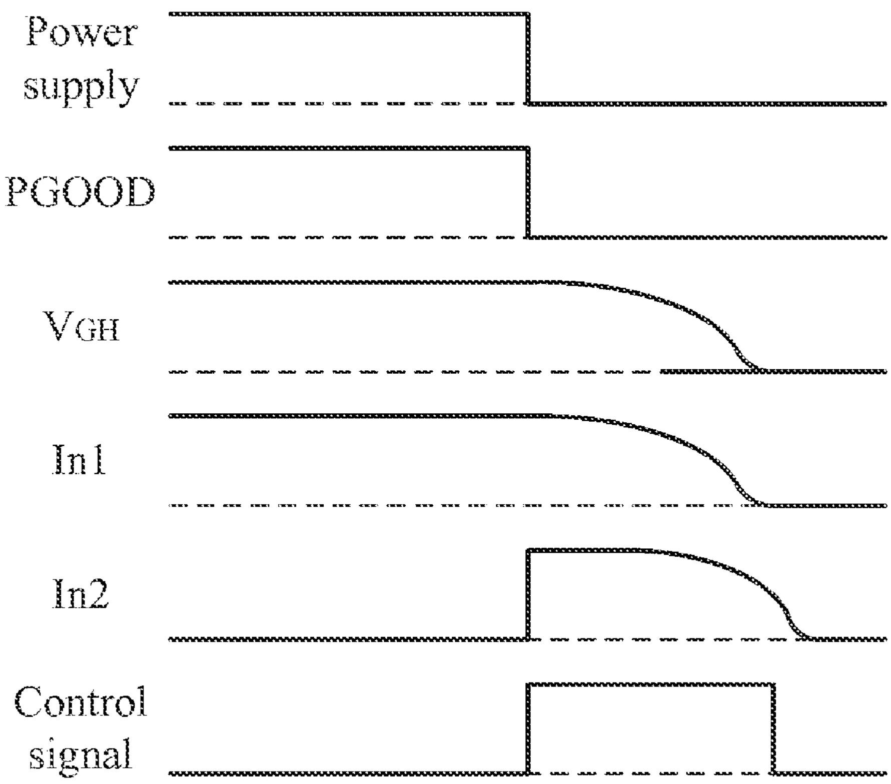
FIG. 4 is a wave diagram of the signals of the power supply, the power state signal, the internal power supply the first input, the second input and the control signal in an embodiment of the present disclosure.

The internal power supply $V_{GH}$ in an embodiment is generated by a Charge pump circuit (not shown) of the liquid crystal display panel 1 according to the power supply of the liquid crystal display panel 1. Please refer to FIG. 4 at the same time, wherein FIG. 4 is a wave diagram of the signals of the power supply, the power state signal, the internal power supply $V_{GH}$, the first input In1, the second input In2 and the control signal 21 in an embodiment of the present disclosure. When the power supply of the liquid crystal display panel 1 is on, the internal power supply $V_{GH}$ is on as well. On the other hand, when the power supply of the liquid crystal display panel 1 is off, the internal power supply $V_{GH}$ is not going to be off in a sudden. Due to the characteristic of the charge pump circuit, the internal power supply $V_{GH}$ will remain on in a certain time period then decrease gradually.

The power state signal PGOOD is generated according to the power supply of the liquid crystal display panel 1 as well. However, the power state signal PGOOD is at a first state when the power supply of the liquid crystal display panel 1 is on and is at a second state opposite from the first state when the power supply of the liquid crystal display panel 1 is off. In an embodiment, the power state signal PGOOD is at high level when the power supply of the liquid crystal display panel 1 is on and is at low level when the power supply of the liquid crystal display panel 1 is off.

The logic output OUT is to generate a control signal 21 according to the first input In1 and the second input In2.

In the present embodiment, the logic gate 20 comprises a power state NMOS 200, a MOS capacitor 202, a NAND gate 204 and an inverter 206. The MOS capacitor 202 receives the internal power supply $V_{GH}$ through a load to store electrical charges such that when the power supply of the liquid crystal display panel 1 is off, the internal power supply $V_{GH}$ and the stored electrical charges is able to maintain the voltage of the first input In1 at high level for longer duration.

The power state NMOS 200 comprises a drain connected to the second input In2 and the internal power supply $V_{GH}$, a gate to receive the power state signal PGOOD and a source connected to a ground. Therefore, when the power supply of the liquid crystal display panel 1 is on, the power state signal PGOOD is at high level to turn on the power state NMOS 200 such that the second input In2 discharges through the power state NMOS 200 and maintains at a low level. And when the power supply of the liquid crystal display panel 1 is off, the power state signal PGOOD is at low level to turn off the power state NMOS 200 such that the second input In1 receives the internal power supply $V_{GH}$ and maintains at a high level.

Combining the states of the first input In1 and the second input In2 described above, after the operation of the NAND gate 204 and the inverter 206, when the power supply of the liquid crystal display panel 1 is on, the level of the first input In1 and the second input In2 is (1,0) to make the control signal 21 of the logic output OUT becomes a low level in a certain time period. When the power supply of the liquid crystal display panel 1 is off, the level of the first input In1 and the second input In2 is (1,1) to make the control signal 21 of the logic output OUT becomes a high level.

As a result, when the power supply of the liquid crystal display panel 1 is on, the low level of the control signal 21 turns off the control switch 22. Therefore, the power-off control circuit 16 is isolated from the level shifter 10 and the gate pulse modulator 14. The level-shift output 11 receives the voltage from level shifter 10 to control the gate pulse modulator 14 to further control the gates of a plurality of pixels of the pixel array 12.

On the other hand, when the power supply of the liquid crystal display panel 1 is off, the high level of the control signal 21 turns on the control switch 22 in a certain time period. The control switch 22 thus makes the level-shift output 11 discharges such that the level-shift output 11 maintains at a certain level, which is a low level in the present embodiment, to make the gate pulse modulator 14 turn on the gates of the plurality of pixels of the pixel array of the liquid crystal display panel 1 to perform a discharge activity.

Due to the discharge activity, after the power-off of the liquid crystal display panel 1, the pixels of the pixel array 12 is able to discharge during the certain time period to avoid the afterimage effect brought by the remaining electrical charges.

It's noted that in other embodiments, the type of the logic gate and the state of each signal can be modified easily by those skilled in the art to accomplish the same effect.

Figure 3:
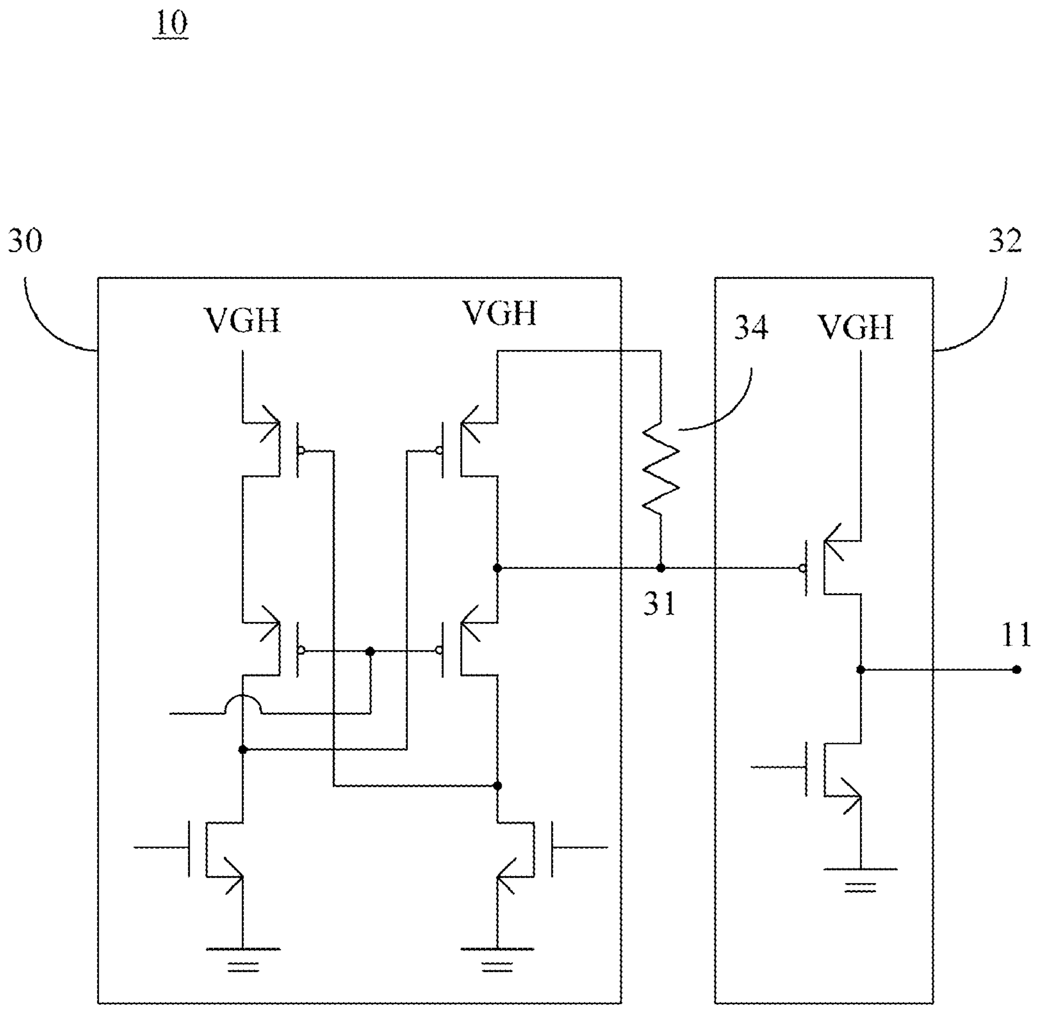
FIG. 3 is a diagram of the level shifter of an embodiment of the present disclosure.

Please refer to FIG. 3. FIG. 3 is a diagram of the level shifter 10 of an embodiment of the present disclosure. The level shifter 10 further comprises a level shift stage 30, an output stage 32 and a pull-high resistor 34 having a first end 31 connected between the level shift stage 30 and the output stage 32, and a second end to receive the internal power supply $V_{GH}$.

The level-shift output 11 is substantially the output of the output stage 32. When the power supply of the liquid crystal display panel 1 is on, the discharging ability of the level shift stage 30 is able to pull down the voltage at the first end 31 even in the presence of the pull-high resistor 34 and is able to pull high the voltage at the first end 31 to make the output stage 32 works. However, when the power supply of the liquid crystal display panel 1 is off, the level shift stage 30 is not in operation and may not be able to pull high the voltage of the first end 31. The low voltage of the first end 31 turns on the output stage 32 such that current from the internal power supply $V_{GH}$keep charging the level-shift output 11. If the pull down ability of the power-off control circuit 16 is poor, the level-shift output 11 is not able to pull down by the power-off control circuit 16, which is an undesirable result. Therefore, the presence of the pull-high resistor 34 provides high voltage to the first end 31 to disable the output stage 32. The power-off control circuit 16 thus can pull down the level-shift output 11 without the effect of the output stage 32 of the level shifter 10.

The present disclosure provides a power-off control circuit adapted in a liquid crystal display panel that is able to make the pixels in the pixel array discharge after the power-off of the liquid crystal display panel. Therefore, the afterimage effect on the panel is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power-off control circuit adapted in a liquid crystal display panel, wherein the liquid crystal display panel comprises a gate pulse modulator and a level shifter having a level-shift output connected to the gate pulse modulator, the power-off control circuit comprises:

a logic gate comprising:

a first input to receive an internal power supply;

a second input to receive a power state signal;

a logic output to generate a control signal according to the first input and the second input; and a power state NMOS comprising:

a drain connected to the second input and the internal power supply;

a gate to receive the power state signal; and a source connected to a ground; and a control switch to receive the control signal and to be connected to the level-shift output;

wherein when a power supply is on, the internal power supply is on and the power state signal is in a first state to turn on the power state NMOS such that the second input maintains at a low level and to make the control signal turn off the control switch;

when the power supply is off, the internal power supply is on during a certain time period and the power state signal is in a second state opposite to the first state to turn off the power state NMOS such that the second input receives the internal power supply and maintains at a high level to make the control signal turn on the control switch in the certain time period such that the voltage of the level-shift output maintains at a certain level to make the gate pulse modulator turn on the gates of a plurality of pixels of a pixel array of the liquid crystal display panel to perform a discharge activity.

2. The power-off control circuit of claim 1, wherein when the power supply is on, the level-shift output receives the voltage from the level shifter to control the gate pulse modulator for further controlling the gates of the pixels.

3. The power-off control circuit of claim 1, the internal power supply is generated by a charge pump circuit according to the power supply.

4. The power-off control circuit of claim 1, wherein the control switch is an NMOS comprising a gate connected to the logic output to receive the control signal and a drain connected to the level-shift output.

5. The power-off control circuit of claim 1, wherein the logic gate comprises a NAND gate.

6. The power-off control circuit of claim 5, wherein the logic gate further comprises an inverter connected between the logic output and the control switch, wherein when the power supply is on, the control signal is at a low level to turn off the control switch, when the power supply is off, the control signal is at a high level to turn on the control switch.

7. The power-off control circuit of claim 1, wherein the logic gate further comprises a MOS capacitor connected to the first input to receive the internal power supply.

8. A liquid crystal display panel comprising:

a level shifter having a level-shift output;

a pixel array;

a gate pulse modulator connected to the level-shift output and the pixel array; and a power-off control circuit comprising:

a logic gate comprising:

a first input to receive an internal power supply;

a second input to receive a power state signal;

a logic output to generate a control signal according to the first input and the second input;

a power state NMOS comprising:

a drain connected to the second input and the internal power supply;

a gate to receive the power state signal; and a source connected to a ground; and a control switch to receive the control signal and to be connected to the level-shift output;

wherein when a power supply is on, the internal power supply is on and the power state signal is in a first state to turn on the power state NMOS such that the second input maintains at a low level and to make the control signal turn off the control switch such that the level-shift output receives the voltage from the level shifter to control the gate pulse modulator to further control the gates of a plurality of pixels of the pixel array;

when the power supply is off, the internal power supply is on during a certain time period and the power state signal is in a second state opposite to the first state to turn off the power state NMOS such that the second input receives the internal power supply and maintains at a high level to make the control signal turn on the control switch in the certain time period such that the voltage of the level-shift output maintains at a certain level to make the gate pulse modulator turn on the gates of the plurality of pixels of the pixel array of the liquid crystal display panel to perform a discharge activity.

9. The liquid crystal display panel of claim 8, wherein the level shifter further comprises a level shift stage, an output stage and a pull-high resistor having a first end connected between the level shift stage and the output stage and a second end to receive the internal power supply, the level-shift output is the output of the output stage, wherein when the power supply is off, the pull-high resistor pulls the voltage of the node between the level shift stage and the output stage to a high level to disable the output stage.

10. The liquid crystal display panel of claim 8, the internal power supply is generated by a charge pump circuit according to the power supply.

11. The liquid crystal display panel of claim 8, wherein the control switch is an NMOS comprising a gate connected to the logic output to receive the control signal and a drain connected to the level-shift output.

12. The liquid crystal display panel of claim 8, wherein the logic gate comprises a NAND gate.

13. The liquid crystal display panel of claim 12, wherein the logic gate further comprises an inverter connected between the logic output and the control switch, wherein when the power supply is on, the control signal is at a low level to turn off the control switch, when the power supply is off, the control signal is at a high level to turn on the control switch.

14. The liquid crystal display panel of claim 8, wherein the logic gate further comprises a MOS capacitor connected to the first input to receive to the internal power supply.

15. A power-off control circuit adapted in a liquid crystal display panel, wherein the liquid crystal display panel comprises a gate pulse modulator and a level shifter having a level-shift output connected to the gate pulse modulator, the power-off control circuit comprises:

a logic gate comprising:

a first input to receive an internal power supply;

a second input to receive a power state signal;

a logic output to generate a control signal according to the first input and the second input; and a power state switch comprising:

a drain connected to the second input and the internal power supply;

a gate to receive the power state signal; and a source connected to a ground; and a control switch to receive the control signal and to be connected to the level-shift output;

wherein when a power supply is on, the internal power supply is on and the power state signal is in a first state to turn on the power state switch such that the second input maintains at a low level and to make the control signal turn off the control switch;

when the power supply is off, the internal power supply is on during a certain time period and the power state signal is in a second state opposite to the first state to turn off the power state switch such that the second input receives the internal power supply and maintains at a high level to make the control signal turn on the control switch in the certain time period such that the voltage of the level-shift output maintains at a certain level to make the gate pulse modulator turn on the gates of a plurality of pixels of a pixel array of the liquid crystal display panel to perform a discharge activity.

16. The power-off control circuit of claim 15, wherein when the power supply is on, the level-shift output receives the voltage from the level shifter to control the gate pulse modulator for further controlling the gates of the pixels.

17. The power-off control circuit of claim 15, the internal power supply is generated by a charge pump circuit according to the power supply.

18. The power-off control circuit of claim 15, wherein the control switch is an NMOS comprising a gate connected to the logic output to receive the control signal and a drain connected to the level-shift output.

19. The power-off control circuit of claim 15, wherein the logic gate comprises a NAND gate.

20. The power-off control circuit of claim 19, wherein the logic gate further comprises an inverter connected between the logic output and the control switch, wherein when the power supply is on, the control signal is at a low level to turn off the control switch, when the power supply is off, the control signal is at a high level to turn on the control switch.

21. The power-off control circuit of claim 15, wherein the logic gate further comprises a MOS capacitor connected to the first input to receive the internal power supply.

* * * * *